United States Patent
Witzigreuter

[11] Patent Number: 6,068,944
[45] Date of Patent: May 30, 2000

[54] AIR DISTRIBUTORS FOR METAL-AIR CELLS

[75] Inventor: John D. Witzigreuter, Dallas, Ga.

[73] Assignee: AER Energy Resources, Inc., Smyrna, Ga.

[21] Appl. No.: 09/094,924

[22] Filed: Jun. 15, 1998

Related U.S. Application Data

[60] Provisional application No. 60/063,155, Oct. 24, 1997.

[51] Int. Cl.[7] ................................................ H01M 4/00
[52] U.S. Cl. .............................................. 429/27; 429/34
[58] Field of Search ........................................ 429/27, 34

[56] References Cited

U.S. PATENT DOCUMENTS

| | | | |
|---|---|---|---|
| 3,871,920 | 3/1975 | Grebler et al. | 136/86 |
| 4,246,324 | 1/1981 | de Nora et al. | 429/17 |
| 4,894,295 | 1/1990 | Cheiky | 429/26 |
| 4,913,983 | 4/1990 | Cheiky | 429/13 |
| 4,950,561 | 8/1990 | Niksa et al. | 429/27 |
| 5,213,910 | 5/1993 | Yamada | 429/32 |
| 5,306,579 | 4/1994 | Shepard, Jr. et al. | 429/77 |
| 5,328,777 | 7/1994 | Bentz et al. | 429/27 |
| 5,354,625 | 10/1994 | Bentz et al. | 429/17 |
| 5,356,729 | 10/1994 | Pedicini | 429/27 |
| 5,362,577 | 11/1994 | Pedicini | 429/27 |
| 5,387,477 | 2/1995 | Cheiky | 429/26 |
| 5,399,445 | 3/1995 | Tinker | 429/90 |
| 5,424,143 | 6/1995 | Shrim | 429/26 |
| 5,486,429 | 1/1996 | Thibault | 429/27 |
| 5,506,067 | 4/1996 | Tinker | 429/27 |
| 5,532,086 | 7/1996 | Thibault et al. | 429/245 |
| 5,560,999 | 10/1996 | Pedicini et al. | 429/27 |
| 5,563,004 | 10/1996 | Buzzelli et al. | 429/27 |
| 5,569,551 | 10/1996 | Pedicini et al. | 429/27 |
| 5,571,630 | 11/1996 | Cheiky | 429/27 |
| 5,639,568 | 6/1997 | Pedicini et al. | 429/27 |
| 5,641,588 | 6/1997 | Sieminski et al. | 429/27 |
| 5,691,074 | 11/1997 | Pedicini | 429/27 |
| 5,733,677 | 3/1998 | Golovin et al. | 429/27 |
| 5,753,384 | 5/1998 | Kimberg | 429/27 |
| 5,776,625 | 7/1998 | Kaufman et al. | 429/30 |
| 5,888,664 | 3/1999 | Sieminski | 249/27 |

FOREIGN PATENT DOCUMENTS

| | | |
|---|---|---|
| 0 311 275 | 9/1987 | European Pat. Off. |
| 0 744 784 A1 | 5/1996 | European Pat. Off. |
| 195 48 297A1 | 12/1995 | Germany . |
| 1221196 | 3/1968 | United Kingdom . |
| WO 96/07209 | 9/1994 | WIPO . |
| WO 97/44848 | 5/1996 | WIPO . |
| WO 97/15090 | 4/1997 | WIPO . |

*Primary Examiner*—Kathryn Gorgos
*Assistant Examiner*—Erica Smith-Hicks

[57] ABSTRACT

A ventilation system for one or more metal-air cells includes a distributor for uniformly distributing oxygen between oxygen electrodes in response to operation of an air moving device. The distributor may be further operative, or associated with one or more restrictive passageways that are operative, while unsealed to provided a barrier function that protects the metal-air cells from the ambient environment while the air moving device is not operating. The perforated member defines a plurality of apertures that at least partially define the reactant air flow path through which air is supplied to the metal-air cells. The perforated member may be a plate or an elongate ventilation passageway, such as a tube. The metal-air cells may be arranged in a stack, and a first of the apertures is more proximate to a first plenum defined between the cells than a second plenum defined between the cells, and a second of the apertures is more proximate to the second plenum than the first plenum. The air moving device may be mounted between protrusions of the cells. Each cell case may included a pair of unitary case portions, each of which has side walls extending from a panel in a common direction to define a cavity. For each cell, the side walls of a first case portion extend into the cavity of a second case portion.

26 Claims, 7 Drawing Sheets

Fig_1

Fig_2

*Fig_9*

*Fig_10*

*Fig_11*

AIR DISTRIBUTORS FOR METAL-AIR CELLS

RELATED APPLICATION

This application claims the benefit of U.S. Provisional Patent Application No. 60/063,155, filed Oct. 24, 1997.

TECHNICAL FIELD

The present invention relates generally to batteries, and more particularly relates to air managers for metal-air cells.

BACKGROUND OF THE INVENTION

Metal-air cells have been recognized as a desirable means for powering portable electronic equipment such as personal computers and camcorders because such cells have a relatively high power output with relatively low weight as compared to other types of electrochemical cells. Metal-air cells utilize oxygen from the ambient air as a reactant in the electrochemical process rather than a heavier material, such as a metal or metallic composition.

Metal-air cells use one or more oxygen electrodes separated from a metallic anode by an aqueous electrolyte. During the operation of a metal-air cell, such as a zinc-air cell, oxygen from the ambient air and water from the electrolyte are converted at the oxygen electrode to hydroxide ions and zinc is oxidized at the anode and reacts with the hydroxide ions, such that water and electrons are released to provide electric energy.

Metal-air cells are often arranged in multiple cell battery packs within a common housing to provide a sufficient amount of electrical power. The result is a relatively lightweight battery. A supply of air must be supplied to the oxygen electrodes of the battery pack in order for the battery pack to supply electricity. Some prior systems sweep a continuous flow of fresh air from the ambient environment across the oxygen electrodes at a flow rate sufficient to achieve the desired power output. Such an arrangement is shown in U.S. Pat. No. 4,913,983 to Cheiky. Cheiky uses a fan within the battery housing to supply the flow of air from the ambient environment to the oxygen electrodes. When the Cheiky battery is turned on an air inlet and an air outlet, which are closed by one or more "air doors" while the battery is turned off, are opened and the fan is operated to create the flow of air into, through, and out of the housing.

In contrast to the nonrecirculating arrangement of Cheiky, U.S. Pat. No. 5,691,074 to Pedicini discloses a system in which a fan recirculates air across the oxygen electrodes of a metal-air battery. The fan also forces air through one or more openings to refresh the recirculating air. The cells provide an output current while the fan is operating but experience minimal discharge while the fan is not operating and the opening or openings remain unsealed. That is, the Pedicini metal-air battery has a long shelf life without requiring operation of air doors, or the like, to open and close the opening or openings. The opening or openings are sized to restrict air flow therethrough while the opening or openings are unsealed and the fan is off.

The restrictive air openings of Pedicini, as well as the air doors of Cheiky, function to substantially isolate the metal-air cells from the ambient environment while the battery is not operating. Isolating the metal-air cells from the ambient environment while the battery is not operating increases the shelf life of the battery and also decreases the detrimental impact of the ambient humidity level on the metal-air cells. Exposed metal-air cells may absorb water from the air through the oxygen electrode and fail due to a condition called flooding, or they may release water vapor from the electrolyte through the oxygen electrode and fail due to drying.

Typically metal-air cells are designed to have a relatively large oxygen electrode surface, so that the largest power output possible can be obtained from a cell of a given volume and weight. Once air is introduced into a metal-air battery housing, the oxygen-bearing air is distributed to all oxygen electrode surfaces. However, in multiple cell systems it is common for an air distribution path to extend from a fan for a lengthy distance and sequentially across oxygen electrode surfaces. Oxygen may be depleted from the air stream flowing along the distribution path so that the oxygen concentration at the end of the distribution path falls below a level desired for optimal power production from all the cells. As a result of the nonuniform air flow distribution, each of the cells may operate at a different current (when the cells are arranged in parallel) and voltage (when the cells are arranged in series), which is not optimal.

If one uses such an air distribution path or paths with a flow through system as in Cheiky, the oxygen depletion problem may be overcome by moving a large volume of air through the battery housing so that the amount of oxygen removed from the air flow in the upstream portions of the distribution path has a negligible impact on the oxygen concentration in downstream portions of the distribution path. However, using such a large volume of fresh air may subject the battery to the flooding or drying problems described above. Pedicini at least partially resolves the flooding or drying out problems by recirculating air within the battery housing and continuously replenishing a portion of the recirculated air. Pedicini may nonetheless experience some oxygen depletion problems if using an air distribution path that extends from a fan for a lengthy distance and sequentially across oxygen electrode surfaces.

Even though numerous improvements to air managers for metal-air cells have been previously disclosed, there is always a desire for air managers that cooperate with metal-air cells in a manner that further enhances the efficiency, power and lifetime of the metal-air cells. For example, further advances in the area of evenly distributing oxygen-laden air across the oxygen electrodes in a metal-air battery should further enhance the efficiency, power and lifetime of metal-air batteries.

SUMMARY OF THE INVENTION

The invention seeks to provide a ventilation system for a metal-air battery that uniformly distributes oxygen-laden air to multiple oxygen electrodes so that an optimum amount of electrical power can be provided over an extended period of time.

In accordance with the invention, this object is accomplished in a metal-air battery having a distributor for approximately uniformly distributing oxygen-laden air to multiple oxygen electrodes, which may be associated with one or more metal-air cells, in response to operation of an air moving device. As a result of the distribution of oxygen, each of the metal-air cells operate at approximately the same current (when the cells are arranged in parallel) and voltage (when the cells are arranged in series) so that the battery provides an optimum amount of electrical power over an extended period of time.

Preferably the distributor is further operative, or associated with one or more restrictive passageways that are operative, while unsealed to provide a barrier function that protects the metal-air cells from the ambient environment at the appropriate time, such as while the air moving device is not operating. That is, while the air moving device is off, or not providing air to the metal-air battery, the distributor and/or restrictive passageway or passageways restrict air flow to the oxygen electrodes so that the metal-air battery is capable of having a long shelf life without requiring a door or doors, or the like, to seal the oxygen electrodes from the ambient environment.

In accordance with one aspect of the invention, a ventilation system is provided for supplying air to a metal-air cell assembly having at least a first oxygen electrode and a second oxygen electrode. The ventilation system has a housing that defines a chamber for receiving the metal-air cell assembly. The ventilation system further includes an air moving device for moving air through a reactant air flow path to the chamber. The ventilation system further includes a perforated member that is positioned in the reactant air flow path for distributing air flow approximately uniformly through the chamber in response to operation of the air moving device. The perforated member may also restrict air flow to the chamber while the air moving device is not providing air to the metal-air battery and the reactant air flow path is unsealed, or alternatively another component defines a restriction in the reactant air flow path that restricts air flow to the chamber while the air moving device is not providing air to the metal-air battery and the reactant air flow path is unsealed.

In another aspect of the present invention, a metal-air power supply is provided. The metal-air power supply includes a first plenum communicating with a first oxygen electrode and a second plenum communicating with a second oxygen electrode. The metal-air power supply further includes a perforated member that is positioned within the reactant air flow path for distributing air flow approximately uniformly between the plenums in response to operation of an air moving device. The perforated member may also restrict air flow to the plenums while the air moving device is off and the reactant air flow path is unsealed, or alternatively another component defines a restriction in the reactant air flow path and restricts air flow to the plenums while the air moving device is not providing air to the metal-air power supply and the reactant air flow path is unsealed.

In another aspect of the invention, the metal-air power supply may be docked to an electronic device that is powered by the metal-air power supply. The electronic device may at least partially define the reactant air flow path, and may include the air moving device and the restriction in the reactant air flow path that restricts air flow to the plenums while the air moving device is off and the air flow path is unsealed.

The air moving device may sweep a continuous flow of fresh air from the ambient environment across the oxygen electrodes at a flow rate sufficient to achieve the desired power output. Alternatively, the air moving device may recirculate air across the oxygen electrodes, and the air moving device may further move air through one or more passageways to refresh the recirculating air.

Regarding the perforated members in greater detail, each preferably defines a plurality of apertures that at least partially define the reactant air flow path, and each aperture defines a width perpendicular to the direction of flow therethrough and a length in the direction of flow therethrough, the length being one or multiple times greater than the width. The perforated member may be a plate, or it may be an elongate ventilation passageway, such as a tube, having the apertures distributed along its length. A first of the apertures is more proximate to a first plenum than a second plenum and a second of the apertures is more proximate to the second plenum than the first plenum. Alternatively the perforated member may be in the form of a bundle of tubes; an aggregate of materials that define air paths therebetween, such as a bundle of fibers with air paths defined between the fibers; a piece or porous material that is preferably thick; or the like.

In another aspect of the invention, the aforementioned oxygen electrodes are part of a stack of metal-air cells. The metal-air cells may have spaced protrusions, and the air moving device may be mounted between protrusions of the cells. Further, each metal-air cell includes a case. Each case may include a pair of unitary case portions, each of which has side walls extending from a panel in a common direction to define a cavity. For each cell, a first case portion is mounted to a second case portion such that the side walls of the first case portion extend into the cavity of the second case portion.

Other objects, features and advantages of the present invention will become apparent upon reviewing the following description of exemplary embodiments of the invention, when taken in conjunction with the drawings and the amended claims.

DETAILED DESCRIPTION OF EXEMPLARY EMBODIMENTS

Figure 1:
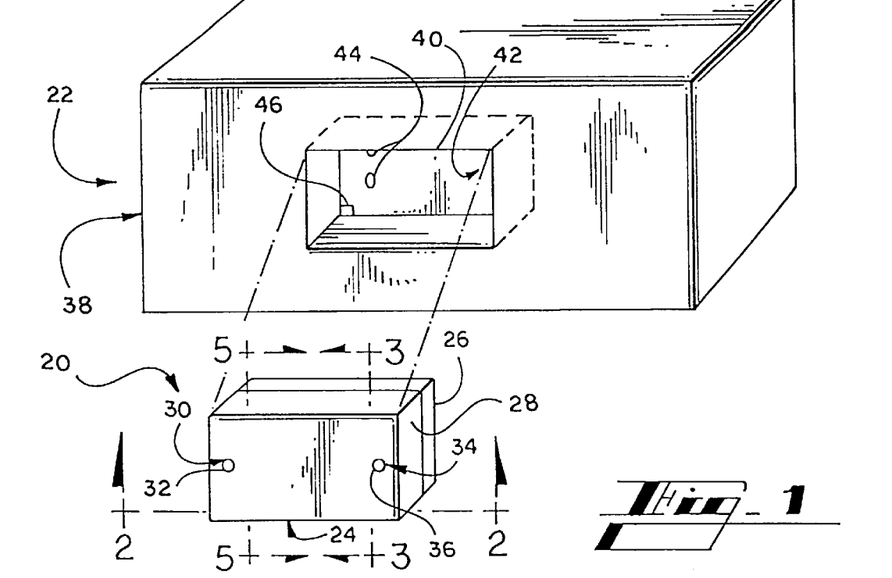
FIG. 1 is a diagrammatic view of a metal-air battery exploded away from an electronic device that is powered by the metal-air battery, in accordance with a first exemplary embodiment of the present invention.

Referring now in more detail to the drawings, in which like numerals refer to like parts throughout the several figures, FIG. 1 diagrammatically illustrates a metal-air battery 20 exploded away from an electronic device 22 that receives and is powered by the metal-air battery. The metal-air battery 20 includes a battery housing 24 through which a reactant air flow path is defined. As will be discussed in greater detail below, air is moved along the reactant air flow path by an air moving device, such as a fan 70 (FIG. 5), to supply air to metal-air cells 60a–f (FIG. 2) within the battery housing 24. An inlet ventilation passageway 30, which includes an inlet opening 32 defined through the battery housing 24, functions as an air inlet portion of the reactant air flow path. An outlet ventilation passageway 34, which includes an outlet opening 36 defined through the battery housing 24, functions as an outlet portion of the reactant air flow path.

Figure 2:
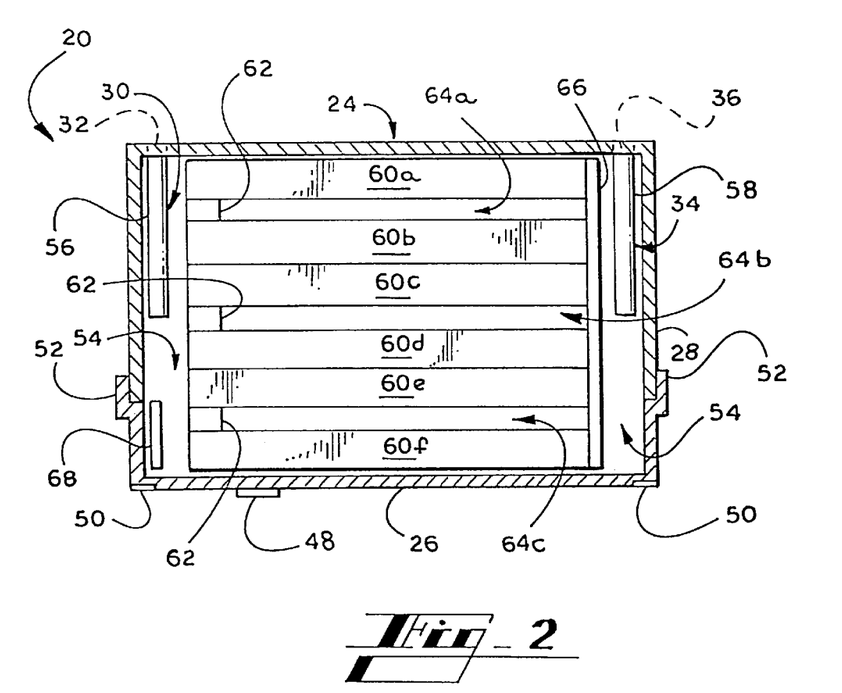
FIG. 2 is a diagrammatic side cross-sectional view of the metal-air battery of FIG. 1, taken along line 2—2 of FIG. 1.

The reactant air flow path can be best visualized with reference also to FIG. 2, which is a diagrammatic side cross-sectional view of the metal-air battery 20 taken along line 2—2 of FIG. 1. The reactant air flow path of the metal-air battery 20 originates from the ambient environment external to the electronic device 22 and the metal-air battery. The reactant air flow path then extends through the inlet ventilation passageway 30, which further includes an air inlet tube 56 that is contiguous with the inlet opening 32 (shown in dashed lines) of the inlet ventilation passageway. The reactant air flow path then extends through a battery chamber 54 defined within the battery housing 24. The reactant air flow path extends between the metal-air cells 60a–f within the chamber 54. Lastly, the reactant air flow path extends through the outlet ventilation passageway 34, which further includes an air outlet tube 58 that is contiguous with the outlet opening 36 (shown in dashed lines) of the outlet ventilation passageway.

A perforated member in the form of a perforated distributor plate 66 is disposed within the battery chamber 54 and at least partially defines the reactant air flow path. Alternatively the perforated member may be in the form of a bundle of tubes; an aggregate of materials that define air paths therebetween, such as a bundle of fibers with air paths defined between the fibers; a piece or porous material that is preferably thick; or the like.

The distributor plate 66 functions to distribute air flowing along the reactant air flow path so that air flow, and therefore oxygen, is evenly distributed between the metal-air cells 60a–f contained within the battery chamber 54. The oxygen is a reactant in the electrochemical reactions of the metal-air cells 60a–f, and the even distribution of oxygen causes the battery 20 to optimally provide power to the electronic device 22, as discussed in greater detail below. Air is moved through the reactant air flow path in response to operation of the fan 70 (FIG. 5), which is hidden from view in FIG. 2.

Referring back to FIG. 1, the electronic device 22 may be a conventional portable computer, camcorder, or any other type of electronic device 22 capable of being powered by one or more metal-air cells. The electronic device 22 includes a device case 38 having a conventional docking station 40 for receiving the metal-air battery 20. More particularly, the docking station 40 defines a conventional docking cavity 42 for receiving the metal-air battery 20.

Those skilled in the art will appreciate that the metal-air battery 20 can be coupled to a variety of differently configured docking stations. For example, a docking station can be flush with an external surface of the device case 38 such that the docking station does not include a docking cavity 42.

The metal-air battery 20 can be repeatedly installed to and removed from the docking station 40 of the electronic device 22. For example, the metal-air battery 20 may be rechargeable, in which case the metal-air battery may be removed from the docking station 40 for recharging purposes, and then be recoupled to the docking station after being recharged. Alternatively, the metal-air battery 20 may be a disposable, primary battery, such that periodically a spent metal-air battery coupled to the docking station 40 is replaced with a fresh metal-air battery.

The docking cavity 42 is defined by an inner wall and four walls that extend outward from the peripheral edges of the inner wall. The docking station 40 includes two conventional electrical contacts 44 and four conventional male locking devices 46 that are all associated with the inner wall of the docking cavity 42. Three of the male locking devices 46 are hidden from view in FIG. 1. A separate male locking device 46 is preferably positioned at each corner of the inner wall of the docking cavity 42, and the male locking devices securely and releasably couple the metal-air battery 20 to the electronic device 22.

As illustrated in FIG. 2, the battery housing 24 is formed by joining a tray 26 and a cover 28. The air openings 32 and 36 (FIG. 1) are defined through the cover 28. The battery tray 26 includes four conventional female locking devices 50, a separate one of which is proximate to each of the four corners of the bottom wall of the battery tray. Two of the female locking devices are hidden from view in FIG. 2. The female locking devices 50 are operative for releasably interlocking with the male locking devices 46 (FIG. 1) of the docking station 40 (FIG. 1). The battery tray 26 further includes a pair of electrical contacts 48 that electrically communicate with the electrical contacts 44 (FIG. 1) of the electronic device 22 (FIG. 1) while the female locking devices 50 are interlocked with the male locking devices 46.

A lip 52 extends around the upper periphery of the battery tray 26 and is in receipt of the bottom edges of the battery cover 28. The battery tray 26 and the battery cover 28 are preferably molded of acrylonitrile butadiene styrene (ABS) or another non-conductive plastic. The seam of the battery housing 24, which is defined where the bottom edges of the battery cover 28 fit into the lip 52, is preferably sealed by solvent bonding.

As mentioned above, the inlet ventilation passageway 30 includes the inlet opening 32 (FIG. 1) and the inlet tube 56, and the outlet ventilation passageway 34 includes the outlet opening 36 (FIG. 1) and the outlet tube 58. The inlet tube 56 is mounted to the battery cover 28 such that the upstream end of the inlet tube is contiguous with and open to the inlet opening 32. Similarly, the outlet tube 58 is mounted to the battery cover 28 such that the downstream end of the outlet tube is contiguous with and open to the outlet opening 36. The ventilation passageways 30 and 34 preferably provide the only communication paths between the battery chamber 54 and the environment external to the battery housing 24. Air entering the inlet opening 32 passes into the battery chamber 54 solely by way of the downstream end of the inlet tube 56. Similarly, air within the battery chamber 54 enters the outlet ventilation passageway 34 solely by way of the upstream end of the outlet tube 58.

The ventilation passageways 30 and 34 are preferably constructed to allow a sufficient amount of air to flow through the reactant air flow path while the fan 70 (FIG. 5) is operating, so that a large a power output, typically at least 20 mA per square cm of air electrode, can be obtained from the metal-air cells 60a–f. Further, the ventilation passageways 30 and 34 are preferably constructed to provide a barrier function while the fan 70 is not operating. Regarding the barrier function in greater detail, the ventilation passageways 30 and 34 function so that air flow through the reactant air flow path is restricted while the fan 70 is not operating. As a result, a minimal amount of oxygen moves into the battery chamber 54 while the fan 70 is not operating. Further, the ventilation passageways 30 and 34, and the entire reactant air flow path, remain unsealed while the fan 70 is off or otherwise not supplying air to the metal-air battery 20. That is, the reactant air flow path continues to define a passageway from the ambient environment to the metal-air cells 60a–f while the fan 70 is off or otherwise not supplying air to the metal-air battery. For example the reactant air flow path is not closed by air doors or the like. That is, the ventilation passageways 30 and 34 are operative, while the fan 70 is not supplying air to the metal-air battery 20, for restricting air flow to the metal-air cells 60a–f so that the metal-air battery 20 experiences minimal self discharge and is capable of having a long shelf life without requiring a door or doors to seal the ventilation passageways. The barrier function of the ventilation passageways 30 and 34 is preferably the result of the sizing of the ventilation passageways, as will be discussed in greater detail below.

Figure 7:
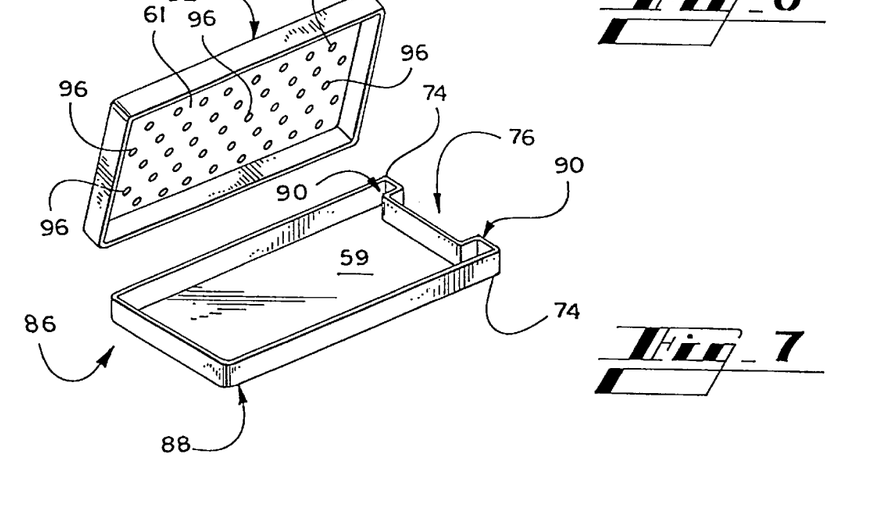
FIG. 7 is an isolated exploded view of a cell case of a metal-air cell of the battery of FIG. 1.
Figure 8:
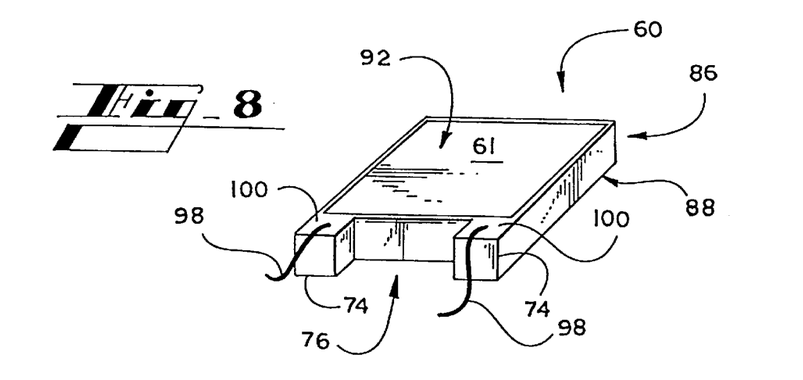
FIG. 8 is a diagrammatic view of a metal-air cell of the battery of FIG. 1.

Each of the metal-air cells 60a–f includes a cell case 86 (FIG. 7) having a closed wall 59 (FIG. 7) and a mask wall 61 (FIGS. 7–8). Oxygen that is a reactant in the electrochemical reaction of the metal-air cells 60a–f is received through the mask walls 61 while the fan 70 (FIG. 5) is operating. As shown in FIG. 2, the metal-air cells 60a–f are arranged in a stack, and each of the mask walls 61 faces one of the plenums 64a, 64b or 64c defined between the metal-air cells within the battery chamber 54. The closed walls 59 of the metal-air cells are isolated from the plenums 64a–c. In contrast, the mask walls 61 of adjacent metal-air cells are spaced apart and define the plenums 64a–c. That is, the mask walls 61 of the metal-air cells 60a and 60b face and at least partially define the plenum 64a, the mask walls 61 of the metal-air cells 60c and 60d face and at least partially define the plenum 64b, and the mask walls 61 of the metal-air cells 60e and 60f face and at least partially define the plenum 64c.

The necessary spacing between the metal-air cells 60a–f, which defines the plenums 64a–c, can be established through the use of spacers 62, only several of which are illustrated in the figures. Any conventional spacers can be used to at least partially provide the plenums 64a–c. Further, the side edges of the metal-air cells 60a–f abut opposite side walls of the battery housing 24 to isolate the plenums 64 from one another.

The distributor plate 66 is mounted across and abuts the downstream ends of the metal-air cells 60a–f. Thus, the distributor plate 66 partially bounds each of the plenums 64a–c and separates the battery chamber 54 into an upstream portion and a downstream portion. The distributor plate 66 separates the upstream and downstream portions of the battery chamber 54 so that air moving from the upstream portion to the downstream portion of the battery chamber must pass through perforations, or apertures 72 (FIGS. 3 and 4), defined through the distributor plate 66. More specifically, the reactant air flow path is divided into branches, and the branches of the reactant air flow path extend through the apertures 72. Alternatively the distributor plate 66 is mounted across and abuts the upstream ends of the metal-air cells 60a–f.

As will be discussed in greater detail below, a fan control circuit that includes a circuit board 68 is preferably utilized to facilitate operation of an air moving device, such as the fan 70 (FIG. 5), to cause air to flow along the reactant air flow path to supply air to metal-air cells 60a–f. More specifically, in response to operation of the fan 70, air flows from the ambient environment into the inlet opening 32 (FIG. 1), through the inlet tube 56, through the fan 70, through the plenums 64a–c, through the apertures 72 (FIGS. 3 and 4) of the distributor plate 66, through the outlet tube 58, and then through the outlet opening 36 back to the ambient environment.

Figures 3, 4, 5:
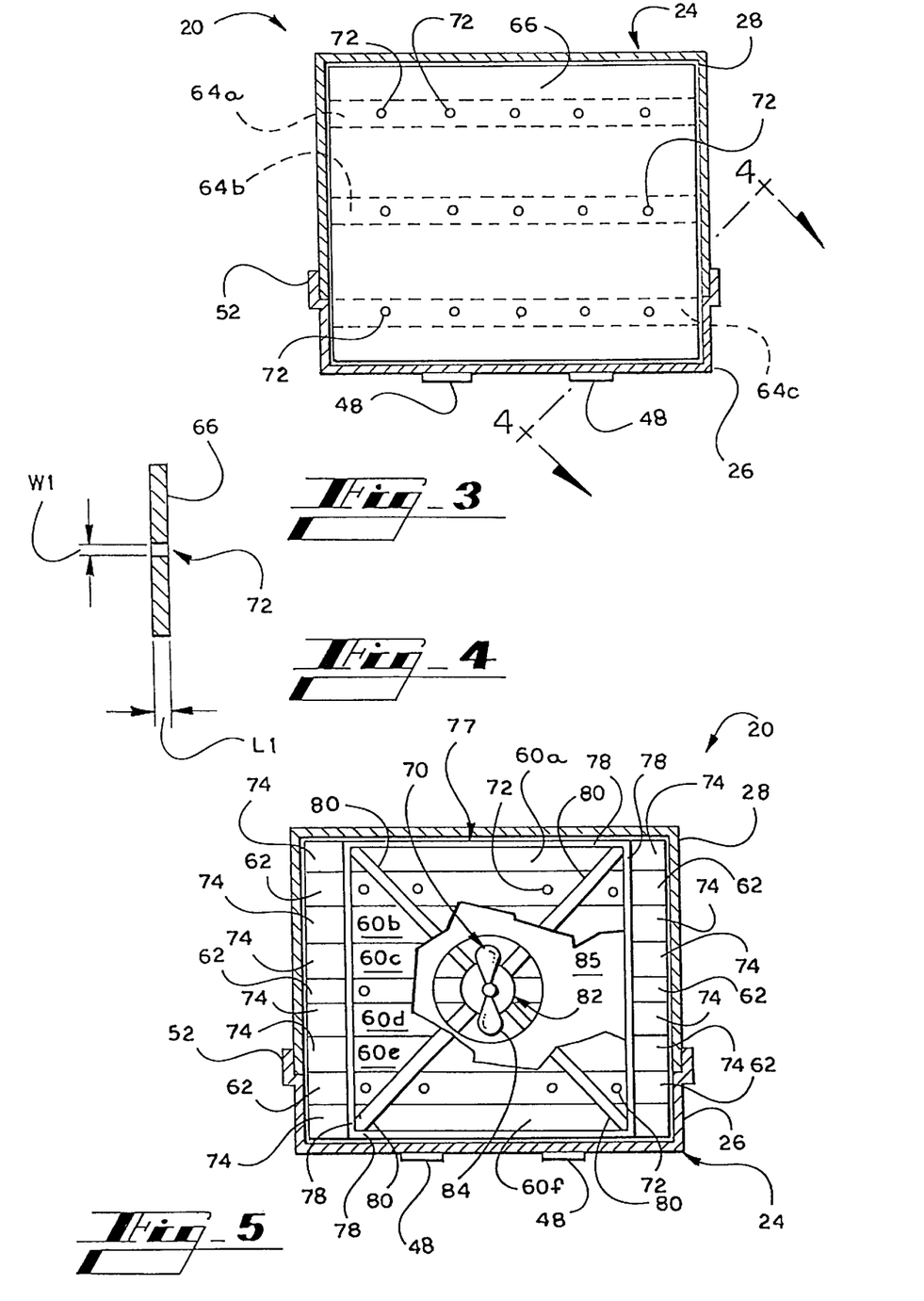
FIG. 3 is a diagrammatic rear cross-sectional view of the metal-air battery of FIG. 1, taken along line 3—3 of FIG. 1.
FIG. 4 is an isolated cross-sectional view of a distributor plate of the metal-air battery of FIG. 1, taken along line 4—4 of FIG. 3.
FIG. 5 is a partially cut-away, diagrammatic front cross-sectional view of the metal-air battery of FIG. 1, taken along line 5—5 of FIG. 1.

FIG. 3 is a diagrammatic cross-sectional view of the metal-air battery 20 taken along line 3—3 of FIG. 1. The peripheral edges of the distributor plate 66 preferably extend to and engage interior surfaces of the battery housing 24 so that the multiple apertures 72 that extend through the distributor plate 68 are the only passages communicating between the upstream and the downstream portions of the battery chamber 54. The apertures are sized and arranged so that air flowing through the reactant air flow path is evenly distributed so that the oxygen concentrations at each of the mask walls 61 (FIGS. 7–8) of the metal-air cells 60a–f (FIG. 2) are approximately identical while the fan 70 (FIG. 5) is operating.

The plenums 64a–c (FIG. 2) are primarily hidden from view in FIG. 3, but the positions of the plenums 64 are illustrated by broken lines in FIG. 3. An upper row of apertures 72 of the distributor plate 66 is aligned with and communicates with the plenum 64a, a middle row of apertures is aligned with and communicates with the plenum 64b, and a lower row of apertures is aligned with and communicates with the plenum 64c. Uniform air flow distribution is preferably achieved by virtue of each of the apertures 72 being nearly identically sized and each of the plenums 64a–c being associated with an identical number of apertures. The uniform air flow distribution causes each of the metal-air cells 60a–f to operate at approximately the same current (when the cells are arranged in parallel) and voltage (when the cells are arranged in series).

FIG. 4 is an isolated cross-sectional view of the distributor plate 66 taken along line 4—4 of FIG. 3. The aperture 72 illustrated in FIG. 4 is representative of all of the other apertures of the distributor plate 66. As illustrated in FIG. 4, each aperture 72 has a length "L1" measured in the direction of flow therethrough, and a width "W1" measured perpendicular to the direction of flow therethrough. The length "L1" is preferably greater than the width "W1" such that the apertures 72 sufficiently restrict flow to provide the uniform air flow distribution. The sizing of the apertures 72 will be discussed in greater detail below.

As mentioned above with reference to FIG. 2 and the first exemplary embodiment of the invention, each of the ventilation passageways 30 and 34 provide a barrier function such that air flow therethrough is restricted while the fan 70 (FIG. 5) is not operating and the ventilation passageways are unsealed. In accordance with an alternative embodiment of the present invention, the outlet ventilation passageway 34 may be large such that the outlet ventilation passageway does not provide the barrier function while the fan 70 is not supplying air to the metal-air battery 20, in which case the distributor plate 66 may be characterized as defining the downstream end of the battery housing 24. In this alternative embodiment, the distributor plate 66 further performs the barrier function in addition to the flow distribution function.

In both the first exemplary embodiment and the alternative embodiment, the apertures 72 in the distributor plate 66 are constructed to allow a sufficient amount of air to flow through the reactant air flow path while the fan 70 (FIG. 5) is operating so that a large power output can be obtained from the metal-air cells 60a–f. In the alternative embodiment, the apertures 72 also function so that air flow through the reactant air flow path is restricted, so that a minimal amount of oxygen moves into the battery chamber 54 (FIG. 2) while the fan 70 is not operating and the reactant air flow path is unsealed. More specifically, apertures 72 remain unsealed while the fan 70 is off or otherwise not supplying air to the metal-air battery 20. That is, the reactant air flow path continues to define a passageway to the metal-air cells 60a–f while the fan is off or otherwise not supplying air to the metal-air battery. For example the reactant air flow path is not closed by air doors or the like. Thus, the apertures 72 in the distributor plate 66 are operative, while the fan 70 is not supplying air to the metal-air battery 20, for restricting air flow to the metal-air cells 60a–f so that the metal-air battery is capable of having a long shelf life without requiring a door or doors to seal the apertures 72. The barrier function of the apertures 72 is preferably the result of the sizing of the apertures. More particularly, each of the apertures 72 preferably has a length and width selected to substantially eliminate air flow therethrough while the fan 70 is not supplying air to the metal-air battery 20. The sizing of the apertures 72 in the distributor plate 66 is discussed in greater detail below.

FIG. 5 is a diagrammatic end cross-sectional view of the metal-air battery 20 taken along line 5—5 of FIG. 1. The fan 70 includes a motor 82 that rotates an impeller 84. The fan 70 is part of a fan assembly 77 that further includes a rectangular fan frame 78 and braces 80 that span between the fan frame and the motor 82. The fan assembly 77 further includes a shroud 85 that is partially cut away in FIG. 5 so that numerous components of the metal-air battery 20 are seen. The shroud 85 extends inward from each side of the fan frame 78 and defines a central circular opening through which air is drawn in response to rotation of the impeller 84. Other types of air moving devices may be used in place of the fan assembly 77.

Figure 6:
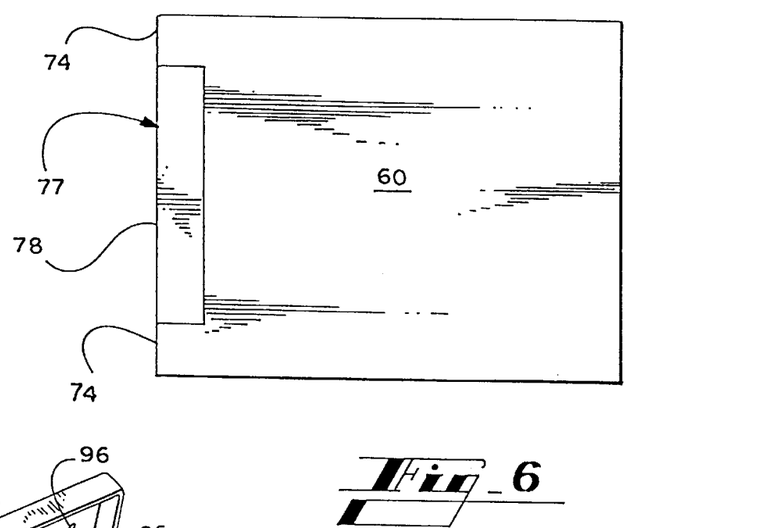
FIG. 6 is a top plan view of a fan frame mounted to a stack of cells of the metal-air battery of FIG. 1.

Each of the metal-air cells 60a–f includes a pair of protrusions 74 between which a recess 76 (FIGS. 7–8) is defined. The fan assembly 77 fits securely into the recesses 76 of the metal-air cells 60a–f. As mentioned previously, the metal-air cells 60a–f are arranged in a stack, and the recesses 76 are defined at the upstream end of the stack such that the fan assembly 77 is mounted into the upstream end of the stack. This nested arrangement is illustrated in FIG. 6, which is an isolated top plan view of the stack of metal air cells 60a–f with the fan assembly 77 nested between the protrusions 74. FIG. 6 is also representative of an isolated bottom plan view of the stack of metal air cells 60a–f with the fan assembly 77 nested between the protrusions 74.

FIG. 7 is an isolated exploded view of a cell case 86 of one of the metal-air cells 60a–f. The cell case 86 includes a tray 88 that includes side walls extending upward from the periphery of the closed wall 59 to define a tray cavity. The tray 88 defines the two protrusions 74, and each protrusion defines a protrusion cavity 90, which will be discussed in greater detail below. Each cell case 86 further includes a cover 92 that includes the mask wall 61, which defines a plurality of apertures 96 therethrough. The cover 92 includes walls that extend downward from the periphery of the mask wall 61.

The cover 92 is installed to the tray 88 by moving the ends of the walls of the cover 92 that are opposite from the mask wall 61 into the tray cavity defined by the tray 88. This movement is continued until the edges of the walls of the cover 92 that are opposite from the mask wall 61 abut the closed wall 59 of the tray 88. As a result, the tray cavity is enclosed.

Each metal-air cell 60 includes an oxygen electrode (not shown) and an anode (not shown) that are enclosed within the tray cavity. The anode is proximate to the closed wall 59 and the oxygen electrode is proximate to the mask wall 61 and receives oxygen through the apertures 96. The openings, or apertures 96, are preferably about 0.055 inch in diameter and together preferably provide an open area of about 4 percent of the area of the oxygen electrode. An open area in a range from about 1 percent to about 5 percent of the oxygen electrode area is suitable.

FIG. 8 is a diagrammatic isolated view of one of the metal-air cells 60a–f, each of which is identical. FIG. 8 is diagrammatic because the apertures 96 (FIG. 7) of the mask wall 61 are not illustrated. External ends of electrode tabs or terminals 98 extend through the protrusion cavities 90 (FIG. 7), and the protrusion cavities are filled with potting, such as epoxy, to hold and provide leak-tight seals around the terminals 98. Internal ends of the terminals 98 are electrically connected, respectively, to the oxygen electrode and anode within the cell case 86. The external ends of the terminals 98 of the several metal-air cells 60a–f are electrically connected, in a manner known to those skilled in the art, to the electrical contacts 48 (FIGS. 2–3 and 5) of the metal-air battery 20 (FIGS. 1–3 and 5) so that the electrical contacts 48 can electrically communicate with the electrical contacts 44 (FIG. 1) of the electronic device 22 (FIG. 1) to power the electronic device in response to operation of the fan 70 (FIG. 5).

The tray 88 and the cover 92 are preferably molded of acrylonitrile butadiene styrene (ABS) or another non-conductive plastic. Each of the tray 88 and the cover 92 are unitary, meaning that each is molded from a single piece of material and does not include separate but joinable parts. When the tray 88 and the cover 92 are assembled as illustrated in FIG. 8, the seam between the tray and the cover is preferably sealed by solvent bonding. The oxygen electrode, anode and other internal components of the metal-air cells 60a–f may be as described in U.S. Pat. No. 5,506,067 or U.S. Provisional Patent Application No. 60/063,155, both of which are incorporated herein by reference.

Alternatively, each of the metal-air cells within the battery housing 24 may be of the type having an anode positioned between a pair of oxygen electrodes. Such dual oxygen electrode metal-air cells are disclosed in U.S. Pat. No. 5,569,551 and U.S. Pat. No. 5,639,568, both of which are incorporated herein by reference. For example, and referring to FIG. 2, a single of such dual oxygen electrode cells can be used in place of the metal-air cells 60b and 60c such that one of the oxygen electrodes of the metal-air dual oxygen electrode cell receives oxygen from the plenum 64a and the other of the oxygen electrodes of the dual oxygen electrode cell receives oxygen from the plenum 64b.

Referring again to FIG. 2, the sizing of the ventilation passageways 30 and 34 will be discussed in detail. Each of the ventilation passageways 30 and 34 preferably has a width that is generally perpendicular to the flow path therethrough, and a length that is generally parallel to the flow path therethrough. The length and the width are selected to substantially eliminate air flow into the housing 24 when the fan 70 (FIG. 5) is not supplying air to the metal-air battery 20. The length is greater than the width, and more preferably the length is greater than about twice the width. The use of larger ratios between length and width of the ventilation passageways 30 and 34 is preferred, and depending upon the nature of the battery 20 (FIGS. 1–3 and 5) the ratio can be more than 200 to 1. However, the preferred ratio of length to width is about 10 to 1.

It is preferable for the inlet tube 56 and the outlet tube 58 to provide the above-mentioned desired length-to-width ratios of the ventilation passageways 30 and 34. That is, the tubes 56 and 58 each have a cross sectional area and length selected to substantially eliminate air flow into the housing 24 when the fan 70 is not supplying air to the metal-air battery 20. The tubes 56 and 58 each may have a length of about 0.3 to 2.5 inches, with about 0.88 to 1.0 inches preferred, and a width of about 0.03 to 0.3 inches, with about 0.09 to 0.19 inches preferred. The total open area of each tube, measured perpendicular to the flow path therethrough, is therefore about 0.0007 to 0.5 square inches.

The preferred total open area of the ventilation passageways 30 and 34 depends upon the desired capacity of the battery 20. Any number of ventilation passageways can be used such that the aggregate open area of all of the ventilation passageways equals this preferred total open area, with each such ventilation passageway having the same or similar ratios of length to width to provide the barrier functions. Those skilled in the art will appreciate that the length of the ventilation passageways 30 and 34 may be increased, and/or the diameter decreased, if the differential pressure created by the fan 70 is increased. A balance between the differential pressure created by the fan 70 and the dimensions of the ventilation passageways 30 and 34 can be found at which air flow into the housing 24 will be sufficiently reduced when the fan is not supplying air to the metal-air battery 20. Although the use of circular ventilation passageways is disclosed, any conventional shape having the required ratios may be employed. Further, the ventilation passageways may be straight or curved in length.

Referring again to FIGS. 3–4, the sizing of the apertures 72 will be discussed in greater detail. For each aperture 72 the length "L1" is preferably greater than the width "W1," and more preferably the length is greater than about twice the width. More specifically, the use of larger ratios between length and width of the apertures 72 may be preferred, especially when the outlet ventilation passageway 34 (FIG. 2) is large such that the outlet ventilation passageway does not restrict air flow therethrough while the fan 70 (FIG. 5) is not supplying air to the metal-air battery 20. The distributor plate 66 provides the barrier function and can be characterized as defining the downstream end of the battery housing 24, when the outlet ventilation passageway 34 does not provide the barrier function as discussed above.

Depending upon the nature of the battery 20 (FIGS. 1–3 and 5) the length to width ratio of the apertures 72 can be more than 10 to 1. However, the preferred ratio of length to width is about 2 to 1. The apertures 72 each may have a length of about 0.02 to 0.2 inches, with about 0.04 to 0.08 inches preferred, and a width of about 0.01 to 0.1 inches, with about 0.03 to 0.06 inches preferred. The total open area of each aperture 72, measured perpendicular to the flow path therethrough, is therefore about 0.00008 to 0.008 square inches.

The preferred total open area of the apertures 72 depends upon the desired capacity of the battery. Any number of apertures 72 can be used such that aggregate open area of all of the apertures 72 equals this preferred total open area, with each such aperture preferably having the same or similar ratios of length to width to provide the desired flow distribution function and optionally the barrier function. Those skilled in the art will appreciate that the length of the apertures 72 may be increased, and/or the width decreased, if the differential pressure created by the fan 70 is increased. A balance between the differential pressure created by the fan 70 and the dimensions of the apertures 72 can be found at which the desired flow distribution and barrier functions are achieved. Although the use of circular apertures 72 is disclosed, any conventional shape having the required ratios may be employed. Further, the apertures 72 may be straight or curved in length.

Referring again to FIGS. 2 and 5, the operation of the fan 70 will be discussed in greater detail. As indicated previously, the metal-air cells 60a–f operate in response to operation of the fan 70 and the operation of the fan 70 is controlled by the fan control circuit which includes the circuit board 68. The fan 70 is powered by the metal-air cells 60a–f, and the circuit board 68 contains electronics for operating the fan 70 in response to the voltage of the cells 60. The control circuit preferably includes a voltage sensor (not shown) that monitors the voltage of the cells 60. The voltage sensor cooperates with the circuit board 68 to operate the fan 70 when the voltage of the metal-air cells 60a–f reaches predetermined levels. The fan control circuit turns the fan 70 on when the voltage across the metal-air cells 60a–f is less than or equal to a predetermined voltage. Likewise, the fan control circuit turns the fan 70 off when the voltage across the metal-air cells 60a–f is greater than or equal to a second predetermined voltage.

The metal-air battery 20 shown in FIGS. 1–3 and 5 may be configured to be a six volt metal-air battery with six metal-air cells. Such a battery has an energy load rating of about 70 watt/hours at a drain rate of about 6 watts and about 80 watt/hours at a drain rate of about 3 watts. The predetermined voltage for turning the fan 70 on is approximately 1.05 volts per cell, while the second predetermined voltage for turning the fan 70 off is approximately 1.10 volts per cell. The voltage monitor turns the fan 70 on when the voltage is less than or equal to approximately 1.05 volts per cell. Likewise, the voltage monitor turns the fan 70 off when the voltage is greater than or equal to approximately 1.10 volts per cell.

The voltage monitor determines the voltage across the oxygen electrode and anode electrode terminals 98 (FIG. 8) of the cells 60. Because the zinc potential within the oxygen electrode of each cell is relatively stable, the oxygen electrode is used to sense the residual oxygen in the cell. As the oxygen within the housing is depleted, the voltage across each oxygen electrode diminishes. Likewise, as the flow of oxygen into the housing increases, the voltage across the oxygen electrode increases.

The voltage monitor can be positioned at any convenient location within or adjacent to the battery housing 24 (FIGS. 1–3 and 5). The preferred voltage monitor is a programmable voltage detection or sensing device, such as that sold by Maxim Integrated Products under the mark MAX8211 and MAX8212. Depending upon the desired operation of the fan 70, the voltage monitor can be an analog circuit for a simple "on/off" switch or can incorporate a microprocessor (not shown) for a more complex algorithm.

Figure 9:
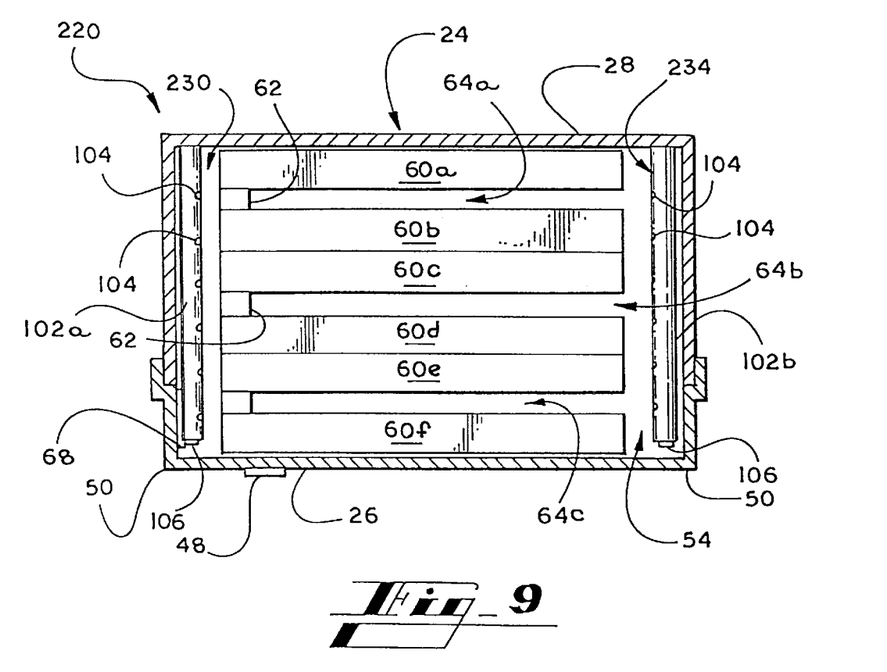
FIG. 9 is a side cross-sectional view of a metal-air battery in accordance with a second exemplary embodiment of the present invention.

FIG. 9 is a side cross-sectional view of a metal-air battery 220 in accordance with a second exemplary embodiment of the present invention. The metal-air battery 220 is constructed and functions identically to the first exemplary metal-air battery 20 of FIGS. 1—3 and 5, except for noted variations and variations that will be apparent from the following description. The metal-air battery 220 does not include the distributor plate 66 of FIGS. 2—5, and the tubes 56 and 58 of FIG. 2 have been replaced with perforated members in the form of a perforated inlet distributor tube 102*a* and a perforated outlet distributor tube 102*b*, respectively. Alternatively only the tube 56 is replaced with the tube 102*a*, or only the tube 58 is replace with the tube 102*b*.

The distributor tubes 102*a* and 102*b* are identical to the tubes 56 and 58, except that each distributor tube 102*a* and 102*b* further functions to distribute air flowing along the reactant air flow path so that air flow, and therefore oxygen, is evenly distributed between the metal-air cells 60*a–f* contained within the battery chamber 54, as will be discussed in greater detail below. More specifically, the distributor tubes 102*a* and 102*b* are identical to the tubes 56 and 58, except that each distributor tube 102*a* and 102*b* defines perforations, or apertures 104, that are evenly spaced along its length and includes a plug 106 closing one of its ends, and the distributor tubes 102*a* and 102*b* may be longer than the tubes 56 and 58 so that the apertures 104 are uniformly arranged with respect to the metal-air cells 60*a–f*.

As illustrated in FIG. 9, the apertures 104 are nearly identically sized and approximately uniformly spaced along the length of the distributor tubes 102*a* and 102*b*. However, it may be desirable to have more or larger apertures 104 toward the plugged ends of the distributor tubes 102*a* and 102*b* in order to cause a uniform flow distribution through the battery chamber 54. Those skilled in the art will appreciate that the required sizing and arrangement of the apertures 104 along the length of the distributor tubes 102*a* and 102*b*, as well as the shape of the distributor tubes, will vary depending upon the differential pressure created by the fan 70 and the sizing and arrangement of the components of the present invention. Also, the ends of the distributor tubes 102*a* and 102*b* may be sealed by solvent bonding, may be closed by collapsing, or may be sealed by other means.

The reactant air flow path of the metal-air battery 220 originates from the ambient environment external to the electronic device 22 and the battery. The reactant air flow path then extends through the inlet ventilation passageway 230, which includes the inlet air distributor tube 102*a* and the inlet opening 32 (FIG. 1). The reactant air flow path enters the inlet air distributor tube 102*a* by way of the inlet opening 32 and exits the air distributor tube 102*a* by way of the apertures 104 of the air distributor tube 102*a*. The reactant air flow path further extends through the battery chamber 54 defined within the battery housing 24. Lastly, the reactant air flow path extends through the outlet ventilation passageway 34, which includes the outlet air distributor tube 102*b* and the outlet opening 36 (FIG. 1). The reactant air flow path enters the air distributor tube 102*b* by way of the apertures 104 of the air distributor tube 102*b* and exits the air distributor tube 102*b* by way of the outlet opening 36.

In accordance with the second exemplary embodiment of the present invention, the volumetric flow rate through each of the apertures 104 is about equal while the fan 70 (FIG. 5) is operating. Thus, the distributor tubes 102*a* and 102*b* function to distribute air flowing along the reactant air flow path so that air flow, and therefore oxygen, is evenly distributed between the metal-air cells 60*a–f* contained within the battery chamber 54. The oxygen is a reactant in the electrochemical reactions of the metal-air cells 60*a–f*, and the even distribution of oxygen causes the battery 220 to optimally provide power to the electronic device 22. Air is moved through the reactant air flow path in response to operation of the fan 70 (FIG. 5), which is hidden from view in FIG. 9.

Figure 10:
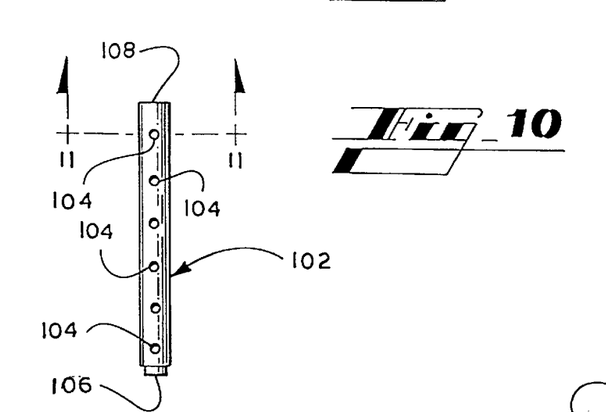
FIG. 10 is an isolated view of an air distributor tube of the metal-air battery of FIG. 9.
Figure 11:
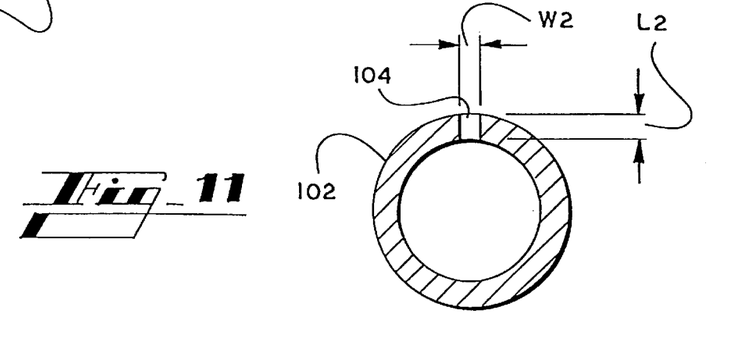
FIG. 11 is a cross-sectional view of the air distributor tube of FIG. 10, taken along line 11—11.

The distributor tubes 102*a* and 102*b* are identical, and FIG. 10 illustrates one of the distributor tubes. The distributor tube 102 includes a mounted end 108 that is mounted to the battery housing 24 and contiguous with the opening 32 or 36 (FIG. 1). The apertures 104 extend through the side wall of the distributor tube 102. FIG. 11, which is a cross sectional view of the distributor tube 102 taken along line 11–11 of FIG. 10, illustrates a representative aperture 104. Each aperture 104 at least partially defines the reactant air flow path through the metal-air battery 220.

Referring to FIG. 9, the ventilation passageways 230 and 234 function to ensure that air flowing along the reactant air flow path is evenly distributed between metal-air cells 60*a–f*, as discussed above. Further, the ventilation passageways 230 and 234 also preferably function to allow a sufficient amount of air to flow through the reactant air flow path while the fan 70 (FIG. 5) is operating so that a large power output can be obtained from the metal-air cells 60*a–f*. Further, the ventilation passageways 230 and 234 are preferably constructed so that the ventilation passageways provide a barrier function while the fan 70 is not operating. Regarding the barrier function in greater detail, the ventilation passageways 230 and 234 function so that air flow through the reactant air flow path is restricted while the fan 70 is not operating. As a result, a minimal amount of oxygen moves into the battery chamber 54 while the fan 70 is not operating. Further, the ventilation passageways 230 and 234 remain unsealed while the fan 70 is off or otherwise not supplying air to the metal-air battery 20. That is, the reactant air flow path continues to define a passageway to the metal-air cells 60*a–f* while the fan 70 is off or otherwise not supplying air to the metal-air battery. For example, the reactant air flow path is not closed by air doors or the like. The ventilation passageways 230 and 234 are operative, while the fan 70 is not supplying air to the metal-air battery 220, for restricting air flow to the metal-air cells 60*a–f* so that the metal-air battery 220 is capable of having a long shelf life without requiring a door or doors, or the like, to seal the ventilation passageways.

The barrier function of the ventilation passageways 230 and 234 is preferably the result of the sizing of the ventilation passageways. Each of the ventilation passageways 230 and 234 preferably has one or more sections that provide the barrier function, and those sections are referred to as barrier sections. For example, the inlet opening 32 (FIG. 1) may be a barrier section, the outlet opening 34 (FIG. 1) may be a barrier section, the portion of the inlet distributor tube 102*a* between the inlet opening 32 and the aperture 104 most proximate to the inlet opening 32 may be a barrier section, the portion of the outlet distributor tube 102*b* between the outlet opening 34 and the aperture 104 most proximate to the outlet opening 34 may be a barrier section, or each of the apertures 104 may be a barrier section. Alternatively, it may be the case that each of the portions of the ventilation passageways 230 and 234 cooperate to provide the barrier function.

Each barrier section of the ventilation passageways 230 and 234 has a width that is generally perpendicular to the flow path therethrough, and a length that is generally parallel to the flow path therethrough. The length is greater than the width, and more preferably the length is greater than about twice the width. The use of larger ratios between length and width of the barrier sections of the ventilation passageways 230 and 234 is preferred, and depending upon the nature of the battery 220 the ratio can be more than 200 to 1. However, the preferred ratio of length to width of the barrier sections of the ventilation passageways 230 and 234 is about 10 to 1.

It is preferred for the apertures 104 to be barrier sections of the ventilation passageways 230 and 234. That is, and referring also to FIG. 11, for each aperture 104 the length "L2" is preferably greater than the width "W2," and more preferably the length is greater than about twice the width. More specifically, the use of larger ratios between length and width of the apertures 104 may be preferred, especially when the inside diameters of the inlet opening 32 (FIG. 1), the outlet opening 36 (FIG. 1), and the distributor tubes 102a and 102b are large such that solely the apertures 104 provide the barrier function that restricts air flow through the reactant air flow path while the fan 70 (FIG. 5) is not supplying air to the metal-air battery 220.

Depending upon the nature of the battery 220, the length to width ratio of the apertures 104 can be more than 10 to 1. However, the preferred ratio of length to width is about 2 to 1. The apertures 104 each may have a length of about 0.02 to 0.2 inches, with about 0.04 to 0.08 inches preferred, and a width of about 0.01 to 0.1 inches, with about 0.09 to 0.19 inches preferred. The total open area of each aperture 104, measured perpendicular to the flow path therethrough, is therefore about 0.00008 to 0.008 square inches.

The preferred total open area of the apertures 104 depends upon the desired capacity of the battery. Any number of apertures 104 can be used such that aggregate open area of all of the apertures 104 equals this preferred total open area, with each such aperture preferably having the same or similar ratios of length to width to provide the desired flow distribution and/or barrier functions. Those skilled in the art will appreciate that the length of the apertures 104 may be increased, and/or the width decreased, if the differential pressure created by the fan 70 is increased. A balance between the differential pressure created by the fan 70 and the dimensions of the apertures 104 can be found at which the desired flow distribution and/or barrier functions are achieved. Whereas increasing the total open area of the apertures 104 will allow more air to flow through the metal-air battery 220 in response to operation of the fan 70, it is preferred to maintain the number, size, and length-to-width rations of the apertures 104 (or other barrier section (s)) within a range that provides the desired barrier function. Although the use of circular apertures 104 is disclosed, any conventional shape having the required ratios may be employed. Further, the apertures 104 may be straight or curved in length.

Figure 12:
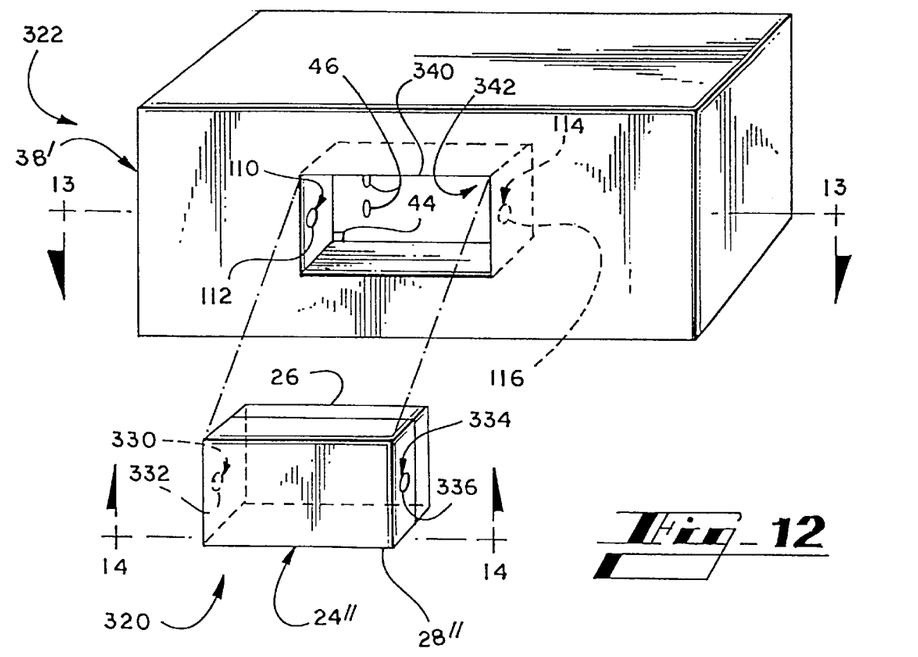
FIG. 12 is a diagrammatic view of a metal-air battery exploded away from an electronic device that is powered by the metal-air battery, in accordance with a third exemplary embodiment of the present invention.

FIG. 12 is a diagrammatic view of a metal-air battery 320 exploded away from an electronic device 322 in accordance with a third exemplary embodiment of the present invention. The electronic device 322 is identical to the electronic device 22 illustrated in FIG. 1, except for noted variations and variations that will be apparent from the following description. As illustrated in FIG. 12, one of the walls defining the docking cavity 342 of the docking station 340 defines an upstream opening 112 of an upstream ventilation passageway 110. Similarly, another of the walls defining the docking cavity 342 defines a downstream opening 116 of a downstream ventilation passageway 114.

The metal-air battery 320 can be identical to any of the previously discussed metal-air batteries, except for the noted variations and variations that will be apparent from the following description. For the metal-air battery 320 the inlet opening 332 of the inlet ventilation passageway 330 is defined through a side wall of the battery cover 328. Similarly, the outlet opening 336 of the outlet ventilation passageway 334 is defined through an opposite side wall of the battery cover 328. While the metal-air battery 320 is installed in the docking cavity 342, the upstream opening 112 is contiguous and communicating with the inlet opening 332, and the downstream opening 116 is contiguous and communicating with the outlet opening 336. As a result, and as will be discussed in greater detail below, the upstream ventilation passageway 110 is an upstream extension of the reactant air flow path defined through the metal-air battery 320, and the downstream ventilation passageway 114 is a downstream extension of the reactant air flow path defined through the metal-air battery 320. Gaskets or other conventional means can be used to minimize undesirable leakage at the interfaces between the respective openings 112, 332, 116 and 336. Some sort of clamping device may be utilized to clamp the metal-air battery 320 to the docking station 340 in a manner that minimizes undesirable leakage at the interfaces between the respective openings 112, 332, 116 and 336.

Figure 13:
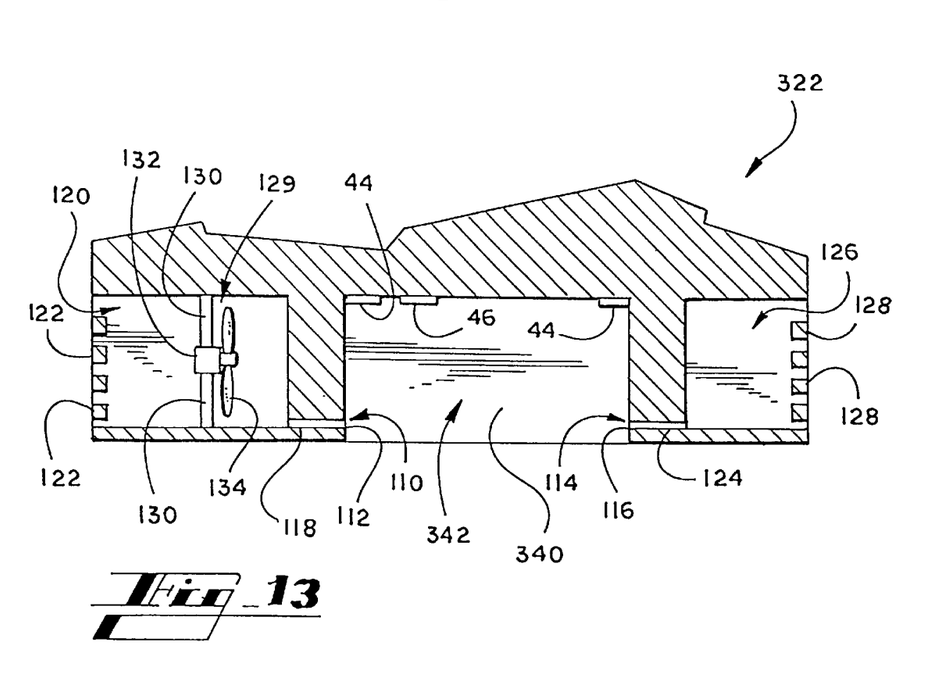
FIG. 13 is a diagrammatic cross-sectional view of the electronic device of FIG. 12, taken along line 13—13.

FIG. 13 is a diagrammatic cross-sectional view of the electronic device 322 taken along line 13—13 of FIG. 12. The upstream ventilation passageway 110 includes an upstream tube 118 communicating with an intake cavity 120 that communicates with the environment exterior to the electronic device 322 through screening or an intake grating 122. The downstream ventilation passageway 114 includes a downstream tube 124 communicating between the downstream opening 116 and a discharge cavity 126 that communicates with the environment exterior to the electronic device 322 through a screening or a discharge grating 128. An air moving device, such as a fan 129, is within the intake cavity 120. The fan 129 includes braces 130 that support a motor 132 that drives an impeller 134. The tubes 118 and 124 may be shaped and sized in the same manner as the tubes 56 and 58 (FIG. 2) to provide a barrier function.

Figure 14:
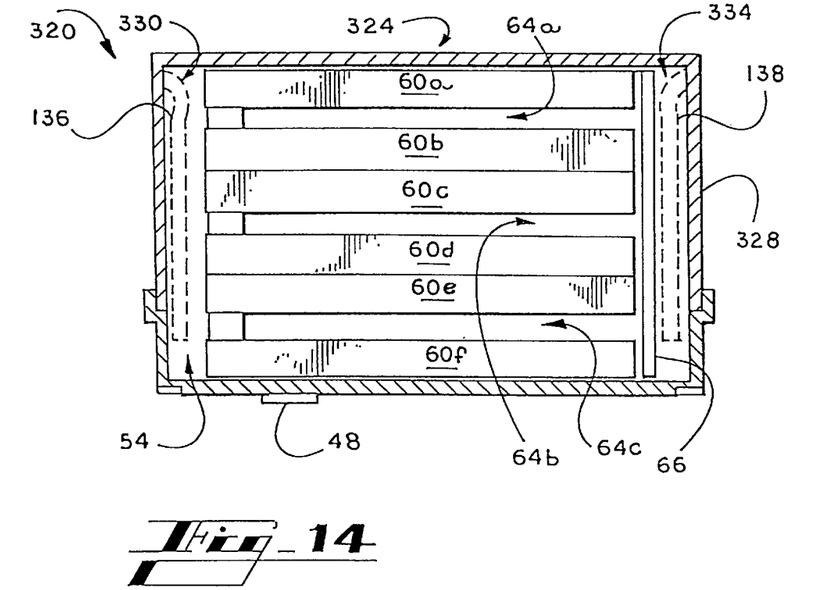
FIG. 14 is a diagrammatic side cross-sectional view of the metal-air battery of FIG. 12, taken along line 14—14.

FIG. 14 is a diagrammatic side cross-sectional view of the metal-air battery 320 taken along line 14—14 of FIG. 12. The metal-air battery 320 can be identical to any of the above discussed metal-air batteries except for the variations noted and variations that will be apparent from the following description. The metal-air battery 320 preferably does not include an air moving device. In embodiments where the ventilation passageways 330 and 334 of the metal-air battery 320 include tubes 136 and 138, those tubes 136 and 138 can be identical to the tubes 56 and 58 (FIG. 2) or the tubes 102a and 102b (FIGS. 9–11), except that the upper portions of the tubes 136 and 138 are bent and mounted to a respective side wall of the battery cover 328 so that they are in communication with and contiguous with their respective opening 332 or 336 (FIG. 12). As illustrated in FIG. 14, the metal-air battery 320 includes the distributor plate 66, such that the tubes 136 and 138 preferably resemble the tubes 56 and 58 (FIG. 2). Alternatively, the metal-air battery 320 does not include the distributor plate 66, in which case the tubes 136 and 138 preferably resemble the tubes 102a and 102b (FIG. 9). Alternatively, the distributor plate 66, and not the tubes 136 and 138, may be included in the metal-air battery 320 when the tubes 118 and 124 of the electronic device 322 are shaped and sized in the same manner as the tubes 56 and 58 (FIG. 2) to provide the barrier function.

While the metal-air battery 320 is installed within the docking cavity 342, the reactant air flow path of the metal-air battery 320 originates from the ambient environment external to the electronic device 22. The reactant air flow path then extends through the intake cavity 120 and the upstream ventilation passageway 110 of the electronic device 322. The reactant air flow path then extends through the inlet ventilation passageway 330, through the battery chamber 54, and then through the outlet ventilation passageway 334 of the metal-air battery 320. Then the reactant air flow path extends through the downstream ventilation passageway 114 and the discharge cavity 126 of the electronic device 322.

Operation of the fan 129 may be controlled as described above with respect to the fan 70 (FIG. 5). Operation of the fan causes air to flow along the reactant air flow path so that air is supplied to the metal-air cells 60a–f. The fan 129 may further supply air through other passageways to provide cooling air flow, or other air flow, to components of the electronic device 322. In summary, there are numerous configurations in which the barrier function is provided for the metal-air battery 320 while the fan 129 is not supplying air to the battery. The fan may not be supplying air to the battery by virtue of the fan being off, the fan not being associated with the battery (for example see FIG. 12), or the air flow being created by the fan may not be routed to the battery.

In accordance with an alternative embodiment, the battery housing 324, or the like, remains attached to the docking station 340. A door, or the like, is provided in the battery housing so that solely the stack of metal-air cells 60a–f can be removed from and reinstalled in the battery housing.

Figure 15:
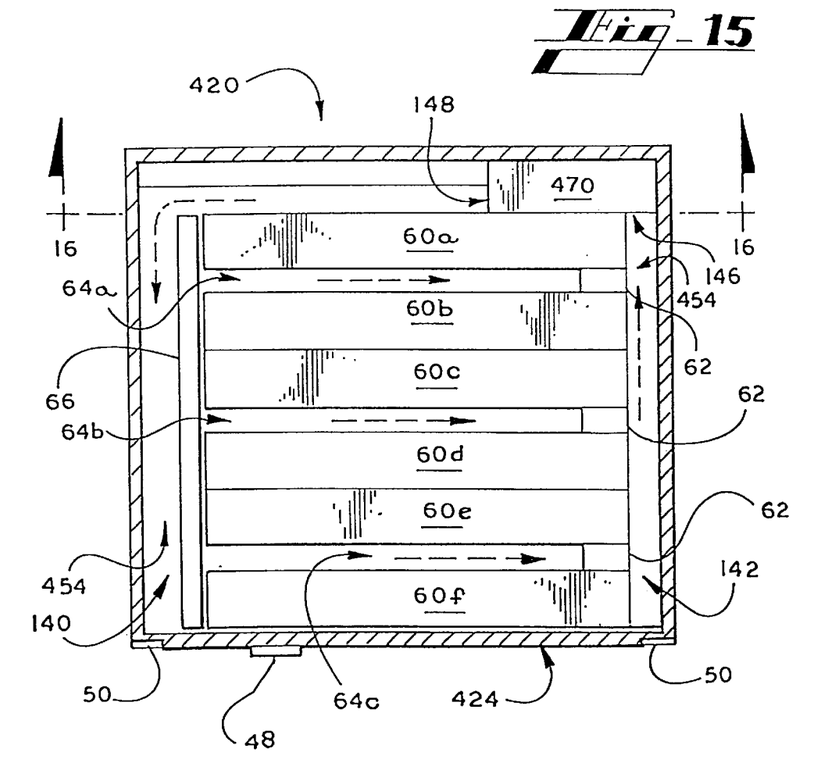
FIG. 15 is a diagrammatic side cross-sectional view of a metal-air battery in accordance with a fourth exemplary embodiment of the present invention.
Figure 16:
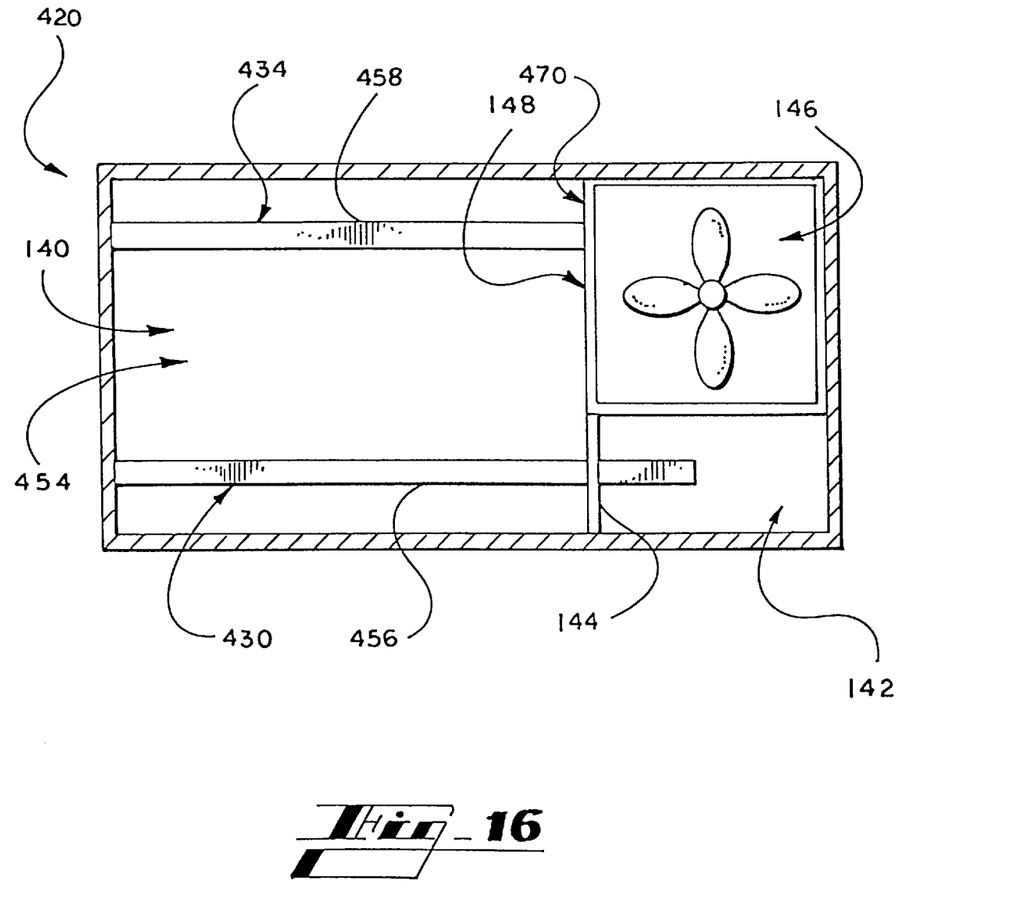
FIG. 16 is a diagrammatic cross-sectional view of the metal-air battery of FIG. 15, taken along line 16—16.

FIG. 15 is a diagrammatic side cross-sectional view of a metal-air battery 420 and FIG. 16 is a diagrammatic cross-sectional view of the metal-air battery 420 taken long line 16—16 of FIG. 15, in accordance with a fourth exemplary embodiment of the present invention. The metal-air battery 420 is identical to the metal-air battery 20 (FIGS. 1–3 and 5), except for noted variations and variations that will be apparent from the following description.

The metal-air battery 420 defines a recirculating reactant air flow path which is illustrated by broken-line arrows in FIG. 15. Air flows along the recirculating reactant air flow path in response to operation of an air moving device, such as the fan 470. The fan 470 includes a motor and impeller that are within a rectangular housing. The distributor plate 66 functions to distribute air flowing along the recirculating reactant air flow path so that air flow, and therefore oxygen, is evenly distributed between metal-air cells 60a–f contained within the battery chamber 454.

The battery chamber 454 is separated into what can be characterized as an upstream chamber 140, which is primarily proximate to the upstream ends of the metal-air cells 60a–f, and a downstream chamber 142, which is primarily proximate to the downstream ends of the metal-air cells. The upstream chamber 140 and the downstream chamber 142 are separated by the metal-air cells 60a–f, the plenums 64a–c, the fan 470, and a barrier plate 66. As illustrated in FIGS. 15—16, portions of the upstream chamber 140 and downstream chamber 142 are above and partially bounded by the closed wall 59 (FIG. 7) of the metal-air cell 60a, and those chamber portions are separated by the fan 470 and the distributor plate 66. The fan 470 includes an inlet 146, and a portion of the inlet 146 is covered by the closed wall 59 of the metal-air cell 60a whereas the uncovered portion of the inlet 146 communicates with the downstream chamber 142. The fan 470 further includes an outlet 148 that communicates with the upstream chamber 140. The inlet tube 456 is hidden from view behind the outlet tube 458 and a portion of the fan 470 in FIG. 15.

The upstream end of the inlet tube 456 of the inlet ventilation passageway 430 communicates with and is contiguous with the inlet opening of the inlet ventilation passageway 430. The inlet opening of the inlet ventilation passageway 430 is not shown (but, for example, see the inlet opening 32 of FIG. 1) but is positioned to directly communicate with the ambient environment while the metal-air battery 420 is installed to the docking station 40 (FIG. 1). The downstream end of the inlet tube 458 communicates with the downstream chamber 142.

The downstream end of the outlet tube 458 of the outlet ventilation passageway 434 communicates with and is contiguous with the outlet opening of the outlet ventilation passageway 434. The outlet opening of the outlet ventilation passageway 434 is not shown (but for example see the outlet opening 36 of FIG. 1) but is positioned to directly communicate with the ambient environment while the metal-air battery 420 is installed to the docking station 40 (FIG. 1). The upstream end of the outlet tube 456 communicates with the outlet 148 of the fan 470.

The inlet tube 456 and outlet tube 458 may be sized and function in the same manner as the inlet and outlet tubes 56 and 58 (FIGS. 2) of the first exemplary embodiment, except more preferably the inlet tube 456 has a length of about 1.5 to 3.5 inches, with about 3.0 inches preferred, and the outlet tube 458 has a length of about 1.0 to 2.5 inches, with about 2.0 inches preferred.

The fan 470 preferably operates in response to the voltage of the metal-air cells 60a–60f of the metal-air battery 420 in the same manner as described above with respect to the first exemplary embodiment. While the fan 470 is operating, a portion of the air being moved by the fan includes air that is drawn into the downstream chamber 142 through the inlet ventilation passageway 430, and another portion of the air being moved by the fan includes air that is forced out of the battery chamber 454 by way of the outlet ventilation passageway 434. The operating fan 470 further causes air to recirculate from the downstream chamber 142 to the upstream chamber 140, and the distributor plate 66 is in the path of that recirculating air and functions to distribute the recirculating flow of air so that air flow, and therefore oxygen, is evenly distributed between metal-air cells 60a–f contained within the battery chamber 454. The air that enters the battery chamber 54 through the inlet tube 56 refreshes the recirculating air.

The ventilation passageways 430 and 434 may be arranged to communicate with the ambient environment by way of ventilation passageways resembling the ventilation passageways 110 and 114 (FIG. 13) and defined by an electronic device capable of receiving and being powered by the metal-air battery 420, as should be understood by those skilled in the art upon understanding this disclosure.

It should be understood that the foregoing relates only to exemplary embodiments of the present invention, and that numerous changes may be made therein without departing from the scope of the invention as defined by the following claims.

What is claimed is:

1. A ventilation system for supplying air to a plurality of metal-air cells each having an oxygen electrode, said ventilation system comprising:

a housing defining a chamber for receiving the metal-air cells;

an air moving device for moving air through a reactant air flow path to the chamber; and a perforated member positioned in the housing at least partially defining the reactant air flow path and having one or more apertures associated with each of the oxygen electrodes to approximately uniformly distribute air flow to the oxygen electrodes in response to operation of the air moving device, and to restrict air flow to the oxygen electrodes while the air moving device is off and the reactant air flow path is unsealed.

2. The ventilation system of claim 1, wherein the means is a perforated member that defines a plurality of apertures that at least partially define the reactant air flow path.

3. The ventilation system of claim 2, wherein each aperture defines a width perpendicular to the direction of flow therethrough and a length in the direction of flow therethrough, the length being greater than the width.

4. The ventilation system of claim 2, wherein the perforated member is a plate.

5. The ventilation system of claim 2, wherein the perforated member is an elongate ventilation passageway and the apertures are distributed along the length of the ventilation passageway.

6. The ventilation system of claim 1, wherein the perforated member defines a plurality of apertures that at least partially define the reactant air flow path and are operative to approximately uniformly distribute air flow through the chamber in response to operation of the air moving device; and further comprising at least one restriction in the reactant air flow path separated from the oxygen electrodes by said apertures and sized to restrict air flow to the oxyoen electrodes while the air moving device is off and the reactant air flow path is unsealed.

7. The ventilation system of claim 6, wherein the perforated member is a plate and the restriction is a tube.

8. A metal-air power supply capable of operating in response to operation of an air moving device, comprising:

a first plenum communicating with a first oxygen electrode;

a second plenum communicating with a second oxygen electrode; and a perforated member positioned to at least partially defining a reactant air flow path to the plenums and having one or more apertures associated with each of the plenums to approximately uniformly distribute air flow between the plenums in response to operation of the air moving device so that the power supply provides an output current, the perforated member restricting air flow through the reactant air flow path while the air moving device is not supplying air to the metal-air power supply and the reactant air flow path remains unsealed.

9. The metal-air power supply of claim 8, further comprising the air moving device.

10. The metal-air power supply of claim 8, wherein the each aperture defines a width perpendicular to the direction of flow therethrough and a length in the direction of flow therethrough, the length being greater than the width.

11. The metal-air power supply of claim 10, wherein the perforated member is a plate.

12. The metal-air power supply of claim 10, wherein the perforated member is an elongate ventilation passageway and the apertures are distributed along the length of the ventilation passageway.

13. The metal-air power supply of claim 8, wherein each aperture defines a width perpendicular to the direction of flow therethrough and a length in the direction of flow therethrough, the length being greater than the width; and further comprising at least one restriction in the reactant air flow path separated from the oxygen electrodes by said apertures and sized to restrict air flow to the plenums while the air moving device is not supplying air to the metal-air power supply.

14. The metal-air power supply of claim 13, wherein the perforated member is a plate and the restriction is a tube.

15. The metal-air power supply of claim 13, in combination with an electronic device that is capable of receiving and being powered by the metal-air power supply and at least partially defines the reactant air flow path, wherein the electronic device contains the restriction.

16. A metal-air power supply capable of operating in response to operation of an air moving device, comprising:

a first plenum communicating with a first oxygen electrode;

a second plenum communicating with a second oxygen electrode; and a perforated member operable for approximately uniformly distributing air flow between the plenums in response to operation of the air moving device so that the power supply provides an output current, wherein the plenums and the perforated member at least partially define the reactant air flow path through which air flows to the oxygen electrodes, and the reactant air flow path remains unsealed while the air moving device is not supplying air to the metal-air power supply.

17. The metal-air power supply of claim 16, further comprising the air moving device that recirculates air through the plenums and the perforated member.

18. The metal-air power supply of claim 16, wherein:

the metal-air power supply further comprises at least one opening at least partially defining the reactant air flow path and capable of communicating with the ambient environment; and the perforated member is positioned between the plenums and the opening.

19. The metal-air power supply of claim 16, further comprising:

a first perforated cell case that contains the first oxygen electrode and at least an anode;

a second perforated cell case that contains the second oxygen electrode and at least an anode; and a housing containing the cell cases, plenums and perforated member.

20. The metal-air power supply of claim 16, wherein the perforated member defines a plurality of apertures that at least partially define the reactant air flow path, and the apertures are sized to restrict air flow through the reactant air flow path while the air moving device is not supplying air to the metal-air power supply, so that the discharge of the power supply is reduced while the air moving device is off.

21. The metal-air power supply of claim 20, wherein the perforated member is a plate.

22. The metal-air power supply of claim 20, wherein the perforated member is a tube.

23. The metal-air power supply of claim 20, wherein each aperture of the perforated member defines a width perpendicular to the direction of flow therethrough and a length in the direction of flow therethrough, the length being greater than about twice the width, and wherein a first of the apertures is more proximate to the first plenum than the second plenum and a second of the apertures is more proximate to the second plenum than the first plenum.

24. The metal-air power supply of claim 16, further comprising a restriction that at least partially defines the reactant air flow path and restricts air flow to the plenums to reduce the discharge of the power supply while the air moving device is not supplying air to the metal-air power supply.

25. The metal-air power supply of claim 24, in combination with an electronic device that is capable of receiving and being powered by the metal-air power supply, wherein the electronic device at least partially defines the reactant air flow path and contains the restriction.

26. A metal-air power supply capable of operating in response to operation of an air moving device, comprising:
- a first plenum communicating with a first oxygen electrode;
- a second plenum communicating with a second oxygen electrode; and
- an elongate tube defining a plurality of apertures that are operable for approximately uniformly distributing air flow between the plenums in response to operation of the air moving device, wherein the apertures are distributed along the length of the tube and a first of the apertures is more proximate to the first plenum than the second plenum and a second of the apertures is more proximate to the second plenum than the first plenum.

* * * * *